United States Patent [19]

Shibata et al.

[11] Patent Number: 4,926,978

[45] Date of Patent: May 22, 1990

[54] FRICTION PAD FOR USE WITH DISC BRAKE

[75] Inventors: Katsuhiro Shibata; Yuichi Azuma; Masao Inoue; Shinichiro Okumura, all of Tochigi, Japan

[73] Assignee: Honda Giken Kogyo Kabushiki Kaisha, Tokyo, Japan

[21] Appl. No.: 360,871

[22] Filed: Jun. 2, 1989

Related U.S. Application Data

[63] Continuation of Ser. No. 356,929, May 25, 1989, abandoned.

[51] Int. Cl.⁵ .............................................. F16D 69/02
[52] U.S. Cl. ................... 188/73.1; 188/250 B; 188/251 A; 188/251 M
[58] Field of Search ............ 188/251 M, 251 A, 73.2, 188/73.1, 71.1, 250 B, 250 G, 255, 256; 192/107 M, 107 R; 523/158; 524/541; 525/501

[56] References Cited

U.S. PATENT DOCUMENTS

| | | | |
|---|---|---|---|
| 3,191,734 | 6/1965 | Batchelor et al. | 188/251 M X |
| 3,210,303 | 10/1965 | Biggs | 188/251 M X |
| 3,434,998 | 3/1969 | Aldrich et al. | 188/251 M X |
| 3,585,102 | 6/1971 | Burgess | 188/251 M X |
| 4,256,801 | 3/1981 | Chuluda | 188/251 A X |
| 4,259,397 | 3/1981 | Saito et al. | 188/251 A X |
| 4,262,788 | 4/1981 | Yamamoto et al. | 188/251 A X |
| 4,273,219 | 6/1981 | Ito | 188/251 M X |
| 4,320,823 | 3/1982 | Covaleski | 188/251 A X |
| 4,373,038 | 2/1983 | Moraw et al. | 188/251 A X |
| 4,384,640 | 5/1983 | Trainor et al. | 188/251 A X |
| 4,415,363 | 11/1983 | Sanftleben | 188/251 M X |
| 4,418,115 | 11/1983 | Le Lannrou | 188/251 A X |
| 4,420,067 | 12/1983 | Yamamoto | 188/251 M X |
| 4,485,898 | 12/1984 | Bracken et al. | 188/250 B |
| 4,694,937 | 9/1987 | Jonas | 188/73.1 |
| 4,756,392 | 7/1988 | McMurray | 188/251 M X |
| 4,760,900 | 8/1988 | Shima et al. | 188/251 M |
| 4,781,275 | 11/1988 | Olsen | 188/251 A |
| 4,792,361 | 12/1988 | Double et al. | 188/251 A X |
| 4,799,579 | 1/1989 | Myers et al. | 188/250 G X |

*Primary Examiner*—Douglas C. Butler
*Attorney, Agent, or Firm*—Wenderoth, Lind & Ponack

[57] ABSTRACT

Improved friction pads for use with disc brake. The pad has a central main portion and a peripheral portion which are formed of different matrices having different compositions. The matrix of the central main portion contains a hard substance or substances having a specified range of hardness whereas the matrix of the peripheral portion does not contain such hard substances or contains in only a limited smaller amount than the central main portion. This prevents the brake disc from wearing due to friction with the pad and thus avoids uneven abrasion of the brake disc.

3 Claims, 1 Drawing Sheet

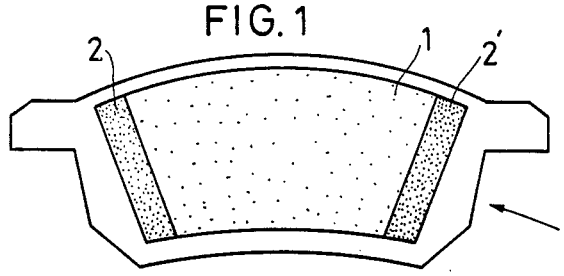
FIG. 1
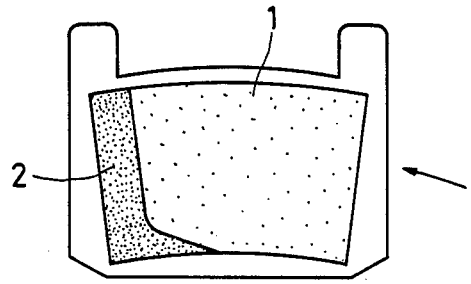
FIG. 2
FIG. 3
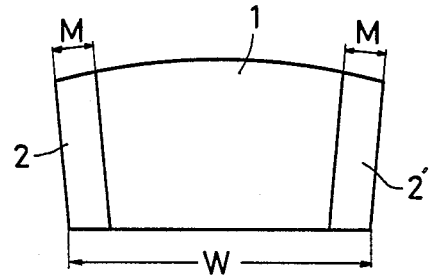
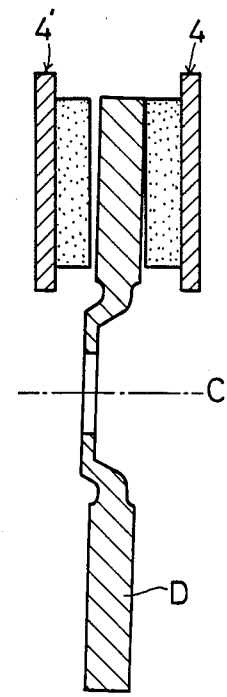
FIG. 5
FIG. 4
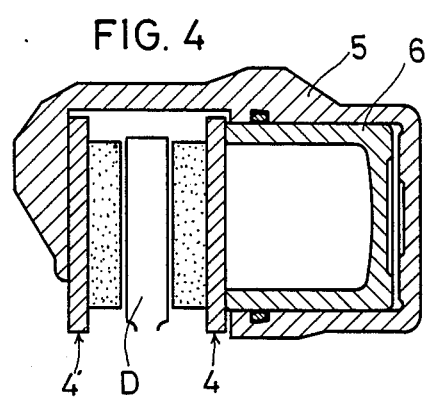

FRICTION PAD FOR USE WITH DISC BRAKE

This application is a continuation of application Ser. No. 07/356,929 filed May 25,1989, now abandoned.

The present invention relates to a friction pad for use with a disc brake for a passenger car, truck, motor cycle, railway vehicle and the like and a disc brake assembly using the same, and more particularly to a friction pad made of matrices of different kinds to minimize the wear of a disc resulting from a slight inclination of the disc, and a disc brake assembly using such a friction pad.

There are many known friction members composed of two or more different materials combined together. Some of such prior art friction members are listed below:

1. Combination of graphite and cast iron (Japanese Examined Patent Publication No. 26-6610)
2. Combination of mild steel and cast iron (Japanese Examined Patent Publication No. 35-2958)
3. Combination of resinous material and cast iron (Japanese Examined Patent Publication No. 36-7202)
4. Combination of resinous material and sintered alloy (Japanese Examined Patent Publication No. 36-8806)
5. Combination of glass and sintered alloy or cast iron (Japanese Examined Patent Publication No. 44-9971)
6. Making the inner and outer pads from different materials (Japanese Examined Patent Publication No. 48-9877)
7. Combination of asbestos-resin material and sintered alloy (Japanese Examined Patent Publications Nos. 56-54495, 55-21221, 55-6780 and 45-6570)
8. Combination of two asbestos materials having different vibration damping factors (Japanese Examined Patent Publication No. 55-21899)
9. Combination of asbestos material and solid lubricating material (Japanese Examined Patent Publication No. 54-42068)
10. Combination of materials containing different components such as metallic powder and graphite powder (Japanese Examined Patent Publication No. 45-30253)
11. Combination of materials having different antiwear properties and arranged in the area ratio of 1:1 (Japanese Unexamined Patent Publication No. 62-13835)
12. Combination of materials having different friction coefficients and arranged in a predetermined area ratio (Japanese Unexamined Patent Publication No. 60-95226)
13. Combination of materials having different resin contents or different friction coefficients and arranged so that their area ratio will be 1:1 (Japanese Unexamined Patent Publication No. 59-77137)
14. Combination of two different materials arranged side by side or at both sides of a diagonal line so that their area ratio will be 1:1 (Japanese Unexamined Patent Publication No. 51-121666)

The objects of the abovementioned prior art are to prevent uneven wear or squeaking of the brake, unlike the object of the present invention, and they have no effect in solving the below-mentioned problems of the present invention.

The friction materials in items 1-5 have a large heat transfer coefficients and cause their mating part to wear excessively. This will inhibit the application of these materials to a disc brake for a passenger car.

The friction materials in items 5-14 contain asbestos which is expensive to reject its dust in the production process.

The friction materials in items 8-10 are somewhat similar to the pad according to the present invention. But the friction material in item 8 differs from the pad of the present invention not only in that it is made of an asbestos material but also in that the materials are used for the central and peripheral portions in the opposite way to the arrangement in the present invention. The friction material in item 9 is similar in construction to the pad of the present invention. But due to the fact that it has an object of improving the braking properties, it is made of completely different materials from the pad according to the present invention. Moreover, one of the two materials is asbestos.

With the friction material of item 10, the objects are to prevent abnormal abrasion of a brake shoe resulting from thermal cure of the friction material at its central portion and avoid heat cracking. Another difference is that in this publication, an asbestos material is used with the exception of one of its embodiments. But since the friction member in this embodiment contains lead instead, its coefficient of friction would be poor. Further, the friction member in item 10 differs from the pad according to the present invention in the area ratio between the two different materials. Thus, none of abovementioned prior art friction materials can solve the problems described later.

A disc brake for use in an automobile has a disc adapted to rotate together with vehicle wheels and a pair of inner and outer pads provided at both sides of the disc and adapted to grip the disc therebetween to brake the vehicle wheels. The pads and the disc naturally wear by repeated brakings. But it has recently come to light that even in a non-braking situation, the disc could wear partially while the vehicle is travelling if the pads are made of non-asbestos materials. This is because it is almost impossible to mount the disc on the rotary shaft precisely at a right angle thereto. Instead, as shown in FIG. 5 in exaggeration, the disc D is inevitably mounted so as to be inclined with respect to the rotary shaft C from its center by about 0.1 mm at its peripheral portion. The disc so mounted will come into frictional contact with the outer or inner pad once in every rotation of the disc. Though the frictional resistance upon the contact is extremely small compared with the friction during braking, the disc tends to wear ineglibibly because the pads made of non-asbestos material contain hard materials.

Since the disc thus gets worn partially, its thickness naturally becomes uneven. When the pads are brought into braking contact with the unevenly worn disc, they will reciprocate axially once in every rotation. This movement will be transmitted to the brake pedal as vibrations and sometimes cause the automobile body to vibrate.

The solutions to this problem include mounting the disc with increased accuracy and employing pads which are less likely to wear the disc (asbestos pads being a typical example). But the former method is technically difficult and the latter one is undesirable because it is expensive to reject the asbestos fiber dust in the production process.

Also, the abovementioned problem might be solved by using a friction member containing a large amount of solid lubricant such as graphite and lead to increase the lubricity. But such a friction member is too low in the coefficient of friction to be applicable to a disc brake with which the effective braking radius is not so large.

Also, the use of lead or its compound except for lead sulfide should be avoided for reasons of sanitation.

It is an object of the present invention to provide a friction pad for a disc brake which solves the abovesaid problems without any decrease in the braking characteristics.

In accordance with the present invention, there is provided a friction pad for use with a disc brake having a rotary disc sandwiched between a pair of friction pads and gripped thereby for braking, the friction pad comprising a central main portion and a peripheral portion made of different matrices having different compositions and arranged in the direction of rotation of the disc; the ratio of area of the matrix of the central main portion to that of the matrix of the peripheral portion being between 10:5 and 10:0.5; both the central main portion and the peripheral portion containing an organic or inorganic fiber such as aramid fiber and glass fiber, a binder such as phenol resin, and an organic or inorganic filler such as cashew resin, carcium carbonate and graphite, but not containing asbestos or lead or lead compound except for lead sulfide; the matrix of the central main portion containing at least one of a substance having a Knoop or Micro-Vickers hardness of not less than 600 and a Moh's hardness of not less than 6 and steel in the form of powder, granule, chip or fiber, the content of the substance or the steel in the matrix of the peripheral portion being either zero per cent by volume, or not more than 90 per cent by volume if the substance or steel in the matrix of the peripheral portion is the same as the substance or steel in the matrix of the central main portion; the sum of values for the peripheral portion calculated by use of the following formula being approximate to, or less than, the sum of values for the central main portion the sum of Knoop or Micro-Vickers hardness of each substance or steel multiplied by content thereof per unit volume if the substance or steel in the matrix of the peripheral portion differs in hardness from the substance or steel in the matrix of the central main portion; other components in the matrix of the peripheral portion being similar to other components in the matrix of the central main portion.

If steel is contained, the steel used in the peripheral portion should preferably be smaller in particle size or thickness than the one used in the central portion.

The pad according to the present invention may contain either one or both substances having a Knoop hardness or Micro-Vickers hardness of not less than 600 and steel in the form of powder, granules, chips or fiber as far as their contents are within the abovementioned range.

In applying the friction pad according to the present invention to a disc brake assembly, it may be used for both the outer and inner pads or for only one of them. With the latter arrangement, any inadvertent assembling error between the inner and outer pads will be prevented.

Other features and objects of the present invention will become apparent from the following description taken with reference to the accompanying drawings, in which:

FIGS. 1 and 2 are front views of two embodiments of the friction pads according to the present invention;

FIG. 3 is a front view of the pad according to the present invention with the back plate removed;

FIG. 4 is a sectional view of a disc brake assembly in which the pad according to the present invention is used and FIG. 5 is a schematic view for illustrating the problems tackled by the present invention.

FIGS. 1 and 2 show mere examples of the pad according to the present invention (arrows indicate the direction of rotation of the disc when the car is running forward). The pad shown in FIG. 1 comprises a matrix 1 forming its central portion and matrices 2 and 2' forming its peripheral portions at both sides thereof. The matrices 2 and 2' may or may not be made of different materials from each other. The matrix 1 may be separate from or integral with the matrix 2 or 2'.

The pad in FIG. 2 comprises a matrix 1 forming its central main portion and a matrix 2 provided at its trailing side. The matrix 2 may be provided at its leading side instead. FIG. 3 shows the matrices of the pad with its back plate removed.

In tackling the abovesaid problems, the present inventors have checked which part of the pads are brought into frictional contact with the disc, namely, part or the whole surface of the pads, and the inner pad or the outer pad.

The results show that the pads get into frictional contact with the disc at a very narrow area, that the inter pad comes into contact with the disc over a larger area than the outer pad, that the major area of contact is at the peripheral portions of each pad, i.e. at the leading and trailing sides of the disc rather than at its central portion, and that the degree of friction at its radially outer area differs from at its radially inner area, depending on the kind of brake. With the above results in view, the present inventors have reached a conclusion that the aforementioned problem can be solved by making the pad from two different matrices, one for its peripheral portion and the other for its central portion.

Also, it was found out that the major cause for wearing the disc is steel fiber and substances which are high in Knoop hardness, Micro-Vickers hardness or Moh's hardness and that the degree of wear is proportional to these hardness and the amounts of the substances.

It was also found out that the degree of wear is proportional to the square of the particle size and thickness of steel fiber.

These findings were also taken into consideration to reach the pad according to the present invention.

In this respect, the matrix for the central main portion of the pad has to have the characteristics necessary for a friction material. Among other things, the coefficient of friction has to be not less than 0.3. For this purpose, it is necessary that the matrix contain steel and/or substances having a hardness of not less than 6 in Moh's hardness and not less than 600 in Knoop or Micro-Vickers hardness. In order to further increase the coefficient of friction, the matrix should preferably contain a small amount of substances having a Moh's hardness of not less than 7 or 8 or Knoop or Micro-Vickers hardness of 800–1300.

On the other hand, the matrix for the peripheral portion of the pad should preferably not contain the abovementioned substances or steel to prevent the disc from wearing owing to the mounting error. But from the standpoint of friction properties, it should contain some amount of such substances within certain ranges.

The selection of such substances should be made taking into consideration the area of matrix at the peripheral portion of the pad. If the matrix forming the peripheral portion of the pad has a small area, it may not contain the abovementioned substances or steel because the friction property of the peripheral portion will not have a significant influence on the friction property of the entire pad. If it has a large area, it should contain a certain amount of these substances and/or steel because the friction property of the peripheral portion is inegligible.

If such substances and steel used in the peripheral portion are of the same kinds as those contained in the matrix forming the central portion, their content should be not more than 90 per cent of the content of such substances and steel in the central portion. If they are different in kind and hardness from those used in the central portion, it is essential that the sum of values obtained by the abovementioned formula (1) for the peripheral portion be approximate to, or smaller than, the sum of values obtained by the same formula for the central portion.

We shall explain the meaning of the word "approximate to". If the sum of values for the matrix of the peripheral portion calculated by use of the formula (1) is be smaller than the sum of values at the central portion, there is no problem.

But in certain cases, the sum of values for the peripheral portion may be even larger than that for the central portion. For example, even if the matrices forming the central portion and the peripheral portion contain substances each having a Knoop hardness of more than 600 and 900 in the following ratio;

Matrix forming the central portion
  Substance having a Knoop hardness of 900×5 per cent + Substance having a Knoop hardness of 600×8 per cent,
Matrix forming the peripheral portion
  Substance having a Knoop hardness of 900×0 per cent + Substance having a Knoop hardness of 600×8 per cent the object of the present invention will be attained provided the mating disc is designed to come into frictional contact with only the matrix forming the central portion. The expression "approximate to" is used to cover a pad having such a structure in the extent of the present invention.

Further the wear rate of the disc has to be taken into consideration in determining the area ratio between the matrices 1 and 2. In accordance with the present invention, the ratio of area of the matrix of the central portion to that of the matrix of the peripheral portion should be between 10:5 and 10:0.5. If it is less than 10:0.5, part of the matrix of the central portion tends to get into frictional contact with the disc while the vehicle is travelling, thus lowering the effect of the present invention. On the other hand, if it is larger than 10:5, in other words, if the area of the peripheral portion is larger than that of the portion brought into frictional contact with the disc, the coefficient of friction of the entire pad might be unnecessarily low.

The other substances in the matrix forming the peripheral portion of the pad should be similar in characteristics and quality to those in the matrix forming the central portion. If the other substance is of a single composition, e.g. a metal such as copper or graphite, it will be difficult to arrange a matrix for the peripheral portion of the pad effectively and inexpensively in a limited space so that the pad will have a sufficient strength to withstand the braking force. Also, it is undesirable that the friction characteristics of the single substance differ remarkably from that of the central portion.

But at the same time, the components for the central portion and those for the peripheral portion do not necessarily have to be similar to each other in so strict a sense. However it is often advantageous from an economical viewpoint to mold the matrix for the central portion and that for the peripheral portion simultaneously. Further, in order to give the pad sufficient wear resistance, strength and heat resistance, the other component of the peripheral portion as well as that of the central portion should be made of a composite material containing phenolic resin or the like.

EXAMPLE

The substances shown in Table 1 were weighed out in the ratio shown therein by conventional procedure and mixed together to obtain materials A, B, C and D for the matrices of the pad according to the present invention.

The materials A and B were individually put into a mold having a width W (FIG. 3) of 130 mm, heat-pressed for 10 minutes at a temperature of 170 C. and then subjected to a heat treatment in a furnace at 200 C. for 15 hours to produce pads u (made from the material A) and v (made from the material B).

In the same manner, pads w, x, y and z were each made from two of the materials A to D as shown in Table 2 so that the pads w and x will have dimensions W (FIG. 3) of 130 mm and M of 21 mm and the pads y and z will have dimensions W of 130 mm and M of 5 mm.

The pads thus obtained were put to a braking test in which a dynamometer capable of simulating an actual braking condition during the driving was used to apply brakes once every five minutes over a period of 50 hours. Thereafter, the thickness of each mating disc was measured at the most worn point and the least worn point to see the difference therebetween.

The discs used in the above tests were actually mounted on an automobile. Brakes were repeatedly applied ten times while the automobile was travelling to check the degree of judder observed on the body of the car. The results of the tests are shown in Table 3.

FIG. 4 shows a disc brake assembly in which the pads according to the present invention are used. It is of a floating type. For at least one of its inner and outerpads 4 and 4', the pad according to the present invention is used. Numerals 5 and 6 designate a floating caliper and a brake piston, respectively.

TABLE 1

| | (in volume %) | | | |
|---|---|---|---|---|
| | A | B | C | D |
| Steel fiber | 20 | 0 | 10 | 0 |
| Alumina fiber | 5 | 5 | 0 | 0 |
| Glass fiber | 0 | 10 | 0 | 15 |
| Aramid fiber | 10 | 15 | 15 | 15 |
| Phlogopite | 0 | 5 | 0 | 5 |
| Zircon sand | 0 | 5 | 0 | 0 |
| Silica powder | 3 | 0 | 0 | 0 |
| Calcium carbonate | 14 | 12 | 27 | 17 |
| Hycar 1411 | 5 | 5 | 5 | 5 |
| Cashew resin powder | 10 | 10 | 10 | 10 |
| Phenol resin | 20 | 20 | 20 | 20 |
| Graphite | 10 | 10 | 10 | 10 |
| Molybdenum disulfide | 3 | 3 | 3 | 3 |

TABLE 1-continued

| | (in volume %) | | | |
|---|---|---|---|---|
| | A | B | C | D |
| | 100 | 100 | 100 | 100 |

TABLE 2

| | Material of peripheral portion | Material of central portion |
|---|---|---|
| w | C | A |
| x | D | B |
| y | D | A |
| z | C | B |

TABLE 3

| Inner pad | Outer pad | Difference of wear (in μm) | Judder |
|---|---|---|---|
| u | u | 45 | Marked |
| v | v | 39 | Marked |
| w | w | 9 | No |
| x | x | 8 | No |
| y | y | 15 | No |
| z | z | 14 | No |
| w | u | 17 | No |

What is claimed is:

1. A friction pad for use with a disc brake having a rotary disc sandwiched between a pair of friction pads and gripped thereby for braking, said friction pad comprising a central main portion and a peripheral portion made of different matrices having different compositions and arranged in the direction of rotation of the disc; the ratio of area of the matrix of said central main portion to that of the matrix of said peripheral portion being between 10:5 and 10:0.5; both said central main portion and said peripheral portion containing an organic or inorganic fiber such as aramid fiber and glass fiber, a binder such as phenol resin, and an organic or inorganic filler such as cashew resin, carcium carbonate and graphite, but not containing asbestos or lead or lead compound except for lead sulfide; the matrix of said central main portion containing at least one of a substance having a Knoop or Micro-Vickers hardness of not less than 600 and a Moh's hardness of not less than 6 and steel in the form of powder, granule, chip or fiber, the content of said substance or said steel in the matrix of said peripheral portion being either zero per cent by volume, or not more than 90 per cent by volume if the substance or steel in the matrix of said peripheral portion is the same as the substance or steel in the matrix of said central main portion; the sum of values for said peripheral portion calculated by use of the following formula being approximate to, or less than, the sum of values for said central main portion the sum of Knoop or Micro-Vickers hardness of each substance or steel multiplied by content thereof per unit volume if said substance or steel in the matrix of said peripheral portion differs in hardness from said substance or steel in the matrix of said central main portion; other components in the matrix of said peripheral portion being similar to other components in the matrix of said central main portion.

2. A friction pad claimed in claim 1, wherein the matrix of said peripheral portion contains finer or smaller steel than the steel contained in the matrix of said central main portion.

3. A disc brake wherein the friction pad claimed in claim 1 is used for one of inner pad and outer pad or both of them.

* * * * *